United States Patent
Vo

(10) Patent No.: US 9,652,521 B2
(45) Date of Patent: *May 16, 2017

(54) COMPRESSING MASSIVE RELATIONAL DATA

(71) Applicant: AT&T Intellectual Property I, L.P., Atlanta, GA (US)

(72) Inventor: Kiem-Phong Vo, Berkeley Heights, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 957 days.

This patent is subject to a terminal disclaimer.

(21) Appl. No.: 13/632,517

(22) Filed: Oct. 1, 2012

(65) Prior Publication Data

US 2013/0031064 A1 Jan. 31, 2013

Related U.S. Application Data

(63) Continuation of application No. 12/655,014, filed on Dec. 22, 2009, now Pat. No. 8,312,026.

(51) Int. Cl.
*G06F 7/00* (2006.01)
*G06F 17/30* (2006.01)

(52) U.S. Cl.
CPC .............. *G06F 17/30595* (2013.01)

(58) Field of Classification Search
CPC .............. G06F 17/30; G06F 17/30595; G06F 17/30312; G06F 17/30289; G06F 17/30477; G06F 17/30442
See application file for complete search history.

(56) References Cited

PUBLICATIONS

"Using Column Dependency to Compress Tables" Vo et al. (2004).*
"Relational Databases" Wikipedia.org (Dec. 19, 2008).*
D.J. Abadi, S.R. Madden, and M.C. Ferreira. Integrating Compression and Execution in Column-Oriented Database Systems. SIGMOD, 2006.
P.A. Alsberg. Space and time savings through large data base compression and dynamic restructuring. Proc of the IEEE, 1975.
A. Buchsbaum, G.S. Fowler, and R. Giancarlo. Improving Table Compression with Combinatorial Optimization. J. of the ACM, 50(6):825-51, 2003.
M. Burrows and D.J. Wheeler. A Block-Sorting Lossless Data Compression Algorithm. Report 124, Digital Systems Research Center, 1994.
C. Cranor, T. Johnson, O. Spatscheck, and V. Shkapenyuk, Gigascope: High performance network monitoring with an SQL interface. SIGMOD, 2003.
J. Edmonds, Optimum Branchings. J of Res. of The National Bureau of Standards, 71B:233-240, 1967.

(Continued)

*Primary Examiner* — Azam Cheema

(57) ABSTRACT

A relational dependency transform is introduced as a way to exploit information redundancy in conditioning data in a relational database for better compressibility. An optimum relational dependency transform of the relational database is first computed. Fields of the relational database are then sorted topologically based on a weighted, directed graph having nodes representing predictor and predictee fields. For each predictee field in the topological order, a transformed field is then computed via the relationship between predictor and predictee in the optimum relational dependency transform.

13 Claims, 5 Drawing Sheets

(56) References Cited

PUBLICATIONS

G.S. Fowler, A. Hume, D.G. Korn, and K.-P. Vo. Migrating an MVS Mainframe Application to a PC. In Proceedings of Usenix'2004. USENIX, 2004.

J. Goldstein, R. Ramakrishnan, and U. Shaft. Compressing Relations and Indexes. ICDE, 1998.

G. Grade and L.D. Shapiro. Data Compression and Database Performance, Proc. ACM/IEEE-CS Symp. on Applied Computing, 1991.

R. Greer. Daytona and the fourth-generation language Cymbal. SIGMOD, 1999.

P. Haas and P. Brown. Bhunt: Automatic Discovery of Fuzzy Algebraic Constraints in Relational Data. VLDB, 2003.

T. Spencer H.N. Gabow, Z. Galil and R.E. Tarjan. Efficient Algorithms for Finding Minimum Spanning Trees in Undirected and Directed Graphs. In Proc. 25-th Annual IEEE Symp. on Found. of Comp. Sci., pp. 347-357, 1984.

D.A. Huffman. A Method for the Construction of Minimum-Redundancy Codes. Proceedings of the IRE, 40(9):1098-1101, Sep. 1952.

I.F. Ilyas, V. Markl, P. Haas, P. Brown, and A. Aboulnaga. CORDS: Automatic Discovery of Correlations and Soft Functional Dependencies. SIGMOD, 2004.

B.R. Iyer and D Wilhite. Data Compresion Support in Databases. VLDB, 1994.

H. Liefke and D. Suciu. Xmill: an efficient compressor for xml data. In Proceedings of SIGMOD, pp. 153-164, 2000.

M. Poess and D. Potapov. Data Compresion in Oracle. VLDB, 2003.

V. Raman and G. Swart. How to Wring a Table Dry: Entropy Compression of Relations and Querying of Compressed Relations. VLDB, 2006.

J. Seward. Bzip2, http://www.bzip.org. Technical report, 1994.

M. Stonebraker, D. Abadi, A. Batkin, X. Chen, M. Cherniak, M. Ferreira, E. Lau, A. Lin, S. Madden, E. O'Neil, P. O'Neil, A. Rasin, N. Tran, and S. Zdonik. A Column-Oriented DBMS. VLDB, 2005.

B.D. Vo and K.-P. Vo. Compressing table data with column dependency. Theoretical Computer Science, v.387, pp. 273-283, 2007.

K.-P. Vo. The Vcodex Platform for Data Compression. In Software and Data Technologies, 2nd Int. Conf, ICSOFT/ENASE, 2007.

I.H. Witten, M. Radford, and J.G. Cleary. Arithmetic Coding for Data Compression. Communications of the ACM, 30(6):520-540, Jun. 1987.

J. Ziv and A. Lempel. A Universal Algorithm for Sequential Data Compression. IEEE Transactions on Information Theory, 23(3):337-343, May 1977.

B.D. Vo and K.-P. Vo, Using Column Dependency to Compress Tables. 2004 IEEE Data Compression Conference, pp. 1-10, 2004.

\* cited by examiner

105 {
```
Leno, J.:1112222:01/01/2009:1:Sangiovese
Leno, J.:1112222:01/03/2009:1:Kazarouge
Simpson, H.:2223333:01/05/2009:1:Coors
Leno, J.:1112222:01/08/2009:1:Kazarouge
Tinker, T.:3334444:01/09/2009:1:Heineken
Simpson, M.:2223334:01/09/2009:1:Budweiser
Leno, K.:1112222:01/09/2009:1:Sangiovese
Bugsy, B.:4445555:01/09/2009:1:Wasatch
```

106 {
```
struct customer
{   char    name[20];
    char    phone[5];
    char    date[10];
    int     amount;
    char    beer[20];
};
```

*Fig. 1*

| File | Gzip | Bzip | FIELD | TABLE | RDT |
|---|---|---|---|---|---|
| vmmpbs 97,711,122 | 17,505,923 5.58 | 9,792,723 9.97 | 9,242,248 10.57 | 6,508,589 15.01 | 4,743,174 20.60 |
| stats 288,962,374 | 21,321,545 13.55 | 10,116,455 28.56 | 3,669,950 78.74 | 3,727,334 77.52 | 3,612,174 80.00 |
| callhoms_aift 352,368,930 | 65,695,522 5.36 | 51,740,479 6.81 | 58,124,006 6.06 | 29,753,852 11.84 | 29,636,797 11.89 |
| flow 466,736,722 | 52,159,891 8.95 | 37,969,053 12.29 | 24,717,734 18.88 | 23,467,742 19.89 | 22,091,416 21.13 |
| thruputcn 2,740,331,062 | 237,322,257 11.55 | 166,554,632 16.45 | 80,729,043 33.94 | 54,962,353 49.86 | 51,608,154 53.10 |

| File | Gzip | | Bzip | | FIELD | | TABLE | | RDT | |
|---|---|---|---|---|---|---|---|---|---|---|
| eGraphs | 5.97 | 1.00 | 37.86 | 9.93 | 15.48 | 6.62 | 39.15 | 7.90 | 17.25 | 8.54 |
| stats | 8.45 | 2.23 | 159.52 | 11.48 | 37.07 | 14.91 | 40.78 | 17.02 | 32.36 | 16.75 |
| ex000002_aff1 | 39.46 | 3.86 | 399.21 | 28.31 | 64.63 | 33.41 | 477.89 | 48.71 | 182.54 | 38.79 |
| flow | 20.62 | 4.12 | 251.15 | 22.84 | 29.04 | 18.05 | 46.41 | 22.27 | 35.65 | 22.02 |
| threepoco | 77.41 | 22.06 | 1013.34 | 148.08 | 122.02 | 97.21 | 115.40 | 111.95 | 191.20 | 95.39 |

*Fig. 4*

COMPRESSING MASSIVE RELATIONAL DATA

CROSS REFERENCE TO RELATED APPLICATIONS

This application is a continuation of U.S. patent application Ser. No. 12/655,014, entitled "Compressing Massive Relational Data," filed on Dec. 22, 2009, which issued on Nov. 13, 2012 as U.S. Pat. No. 8,312,026, the disclosure of which is incorporated herein by reference in its entirety.

FIELD OF THE DISCLOSURE

The present disclosure relates generally to the compression of data in a relational database, and more particularly, to the preparation of data by exploiting type-limited field values, similar field values and field correlations to improve the performance of data compressors.

BACKGROUND

Relational data files store data in the format of records and fields. Examples of such data include transaction tables, event logs, business reports, etc. Massive volumes of relational data are produced daily in large business and information systems, from gigabytes in banking and telephone services to terabytes in IP network monitoring and management systems. Thus, good compression is an important component in these systems to manage costs.

Compression research has evolved over the years from studying only general information models to finding ways to exploit specific structures in data. In H. Liefke and D. Suciu. Xmill: An Efficient Compressor for XML Data, In Proceedings of SIGMOD, pages 153-164 (2000), the contents of which is hereby incorporated by reference herein in its entirety, the authors discussed how XML files could be compressed by grouping data with the same tree paths together. Their work was inspired by the Pzip compressor described in A. Buchsbaum, G. S. Fowler, and R. Giancarlo, Improving Table Compression with Combinatorial Optimization, J. of the ACM, 50(6):825-51 (2003) (hereinafter "Buchsbaum et al."), the contents of which is hereby incorporated by reference herein in its entirety, for a special type of relational data, namely, tables or two-dimensional arrays of bytes. Pzip introduced the idea of fixing some general purpose compressor, then grouping together columns amenable to compress well with that compressor. A different approach to table compression was later introduced B. D. Vo and K.-P. Vo, Compressing Table Data with Column Dependency, Theoretical Computer Science, v. 387, pp. 273-283 (2007) (hereinafter "Vo and Vo"), the contents of which is hereby incorporated by reference herein in its entirety, by automatically discovering certain dependency relations among table columns and using that to reorder data to enhance compressibility.

The use of compression to improve database storage and access has been widely studied, especially along with field-oriented storage schemes. The authors of J. Goldstein, R. Ramakrishnan, and U. Shaft, Compressing Relations and Indexes, ICDE (1998), the contents of which is hereby incorporated by reference herein in its entirety, observed that field data are often sparse within their much larger ranges and developed a frame of reference approach to compactly code such data. In M. Poess and D. Potapov, Data Compression in Oracle, VLDB (2003), the contents of which is hereby incorporated by reference herein in its entirety, the authors discussed how the Oracle DBMS saved space by replacing commonly occurring field attributes by pointers to distinct instances stored in some dictionary. V. Raman and G. Swart, How to Wring a Table Dry: Entropy Compression of Relations and Querying of Compressed Relations, VLDB (2006) (hereinafter "Raman and Swart"), the contents of which is hereby incorporated by reference herein in its entirety, proposed a more comprehensive approach to compress database tables based on exploiting value sparsity, field correlation and lack of record order.

The present disclosure focuses on the problem of compressing relational data files. Despite the apparent similarity, there are notable differences between compressing a database table and compressing a relational data file:

Unordered vs. Ordered: In a database table, record ordering is immaterial as queries can return retrieved records in any order. By contrast, the order of records in a relational data file is often meaningful due to implicit but often unknown factors such as time series data or categories in a presentation or report. As such, a compressed relational data file should always decompress into its exact original state.

Typed vs. Typeless: Schemas in a database specify precisely the type of each field and the association of such fields in their relations. However, such meta-data are often unavailable with a relational data file. That is, little can be assumed beyond being able to partition such a file into sequences of bytes representing records and fields. Any further structures must be automatically deduced.

SUMMARY OF THE DISCLOSURE

In accordance with a first aspect of the disclosure, a method is provided for preparing a relational database R for compression by a compressor C. An optimum relational dependency transform D comprising a set of field dependency relations (p, f) is computed, wherein p is a predictor field of R and f is a predictee field of R. The fields of R are sorting topologically based on a graph $\mathcal{G}$ (D), the graph $\mathcal{G}$ (D) having a node set that is a set of all predictor fields p and predictee fields f, and having an edge set that comprises every dependency relation (p, f) of D, each edge having a weight $C(\delta_p(f))$ wherein a field f is transformed by a transform $\delta_p$ based on a defined permutation of the field p, relative to the compressor C. For each field f in a resulting topologically sorted database R, $\delta_p(f)$ is computed via the relation (p, f)∈D.

The compressor C may be a data compressor tailored for compressing data of types found in the fields of database R.

The step of sorting the fields of R topologically may be based on a set of field-specific orderings of values. In that case, the values in the fields may be sorted as strings of bytes, in a lexicographical order, or may be sorted as numerical values in a numerical order.

An application may define its own ordering for sorting the values in the fields. There preferably are no cyclic sequences in D.

Another aspect of the disclosure is a computer-usable medium having computer readable instructions stored thereon for execution by one or more processors to perform methods described herein According to yet another aspect of the disclosure, a method is provided for compressing a relational database R using a training set of records and a compressor C. Using the training set of records, a relational dependency transform D is computed by (1) computing an optimum relational dependency transform D comprising a set of field dependency relations (p, f) wherein p is a predictor field of R and f is a predictee field of R; (2) sorting the fields of R topologically based on a graph $\mathcal{G}$ (D), the graph $\mathcal{G}$ (D) having a node set that is a set of all predictor fields p and predictee fields f, and having an edge set that comprises every dependency relation (p, f) of D, each edge having a weight $C(\delta_p(f))$ wherein a field f is transformed by a transform $\delta_p$ based on a defined permutation of the field p, relative to the compressor C; and (3) for each field f in a resulting topologically sorted database R, computing $\delta_p(f)$ via the relation (p, f)∈D.

R is then divided into segments comprising groups of records. Using the relational dependency transform D, the fields of each segment are transformed. Each transformed field is then compressed using the compressor C.

These aspects of the disclosure and further advantages thereof will become apparent to those skilled in the art as the present disclosure is described with particular reference to the accompanying drawings.

BRIEF DESCRIPTION OF THE DRAWINGS

FIG. 1 is an exemplary relational data file for illustrating the methods and systems of the present disclosure;

FIG. 4 is a table showing compression and decompression times in seconds for comparing various techniques including the techniques according to the present disclosure.

DETAILED DESCRIPTION

Figure 2:
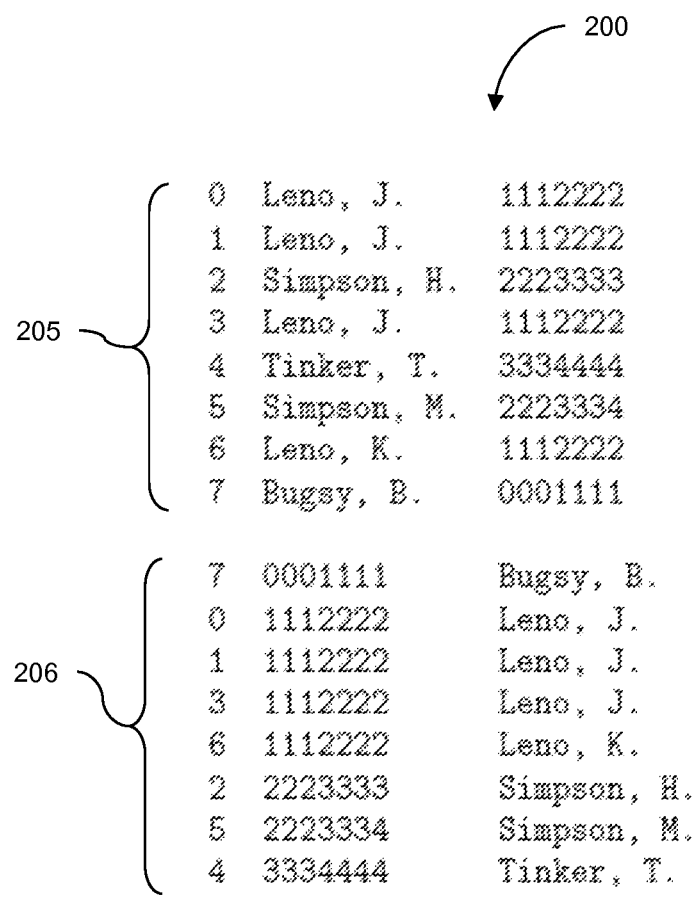
FIG. 2 shows data from the relational data file of FIG. 1 after performing a dependency field transformation according to the present disclosure.

In the present disclosure, the relational dependency transform is discussed. The relational dependency transform is a function to improve the compressibility of a relational data file by reordering its field values in an invertible way. Such a transform is a set of field dependency relations with strengths given by conditional compressive entropy, an information metric suitable for estimating the information content in a field as well as across fields. Experimental results based on large datasets taken from real information systems are presented to show the effectiveness of this compression approach.

Embodiments of the disclosure will be described with reference to the accompanying drawing figures wherein like numbers represent like elements throughout. Before embodiments of the disclosure are explained in detail, it is to be understood that the disclosure is not to be limited in its application to the details of the examples set forth in the following description and/or illustrated in the figures. The disclosure is capable of other embodiments and of being practiced or carried out in a variety of applications. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Relational Data Files

A relational data file R is a byte sequence composing a sequence of records ($r_0, r_1, \ldots, r_{n-1}$). In turn, each record $r_i$ is composed of a sequence of fields ($f_0, f_1, \ldots, f_{n-1}$). Thus, R can be thought of as a two-dimensional array whose elements are byte strings.

A relational data file is assumed to be in record-major order. That is, data are stored record by record with fields from left to right in each record. There are generally two main formats for field data, binary with fixed field lengths, or textual with fields separated by some separator. All examples in this disclosure will be based on the text format.

Unless noted otherwise in the disclosure, the field f indicates the column R[f] of the relational data file R when considered as a two dimensional array. By abusing notation, f is also used to denote the byte string formed by concatenating all values in field f together.

FIG. 1 depicts an example relational data file 100 that stores customer beer purchases. This example relational data file will be used throughout the present disclosure to illustrate the presented concepts and methods. The top portion 105 of the file shows eight records, each including five colon-separated fields: Name, Phone, Date, Amount, and Beer.

Those textual data records could have been externalized forms of binary instances of the C language structure shown in the lower portion 106 of the file. If the structure data were output verbatim, field values would be byte strings with fixed lengths. For example, the Name field would have length 20 while the integer field Amount would have length 4 on a 32-bit machine.

Dependency Transforms

All compression methods aim at reducing redundancy in the information-theoretic content of given data. Three of the more common sources of redundancy in relational data files are type-limited field values, similar field values and field correlations. They are discussed in the following paragraphs.

Type-limited field values: Field values are byte strings so there could be up to $256^k$ different occurrences for a value of length k. However, in practice, the number of possible representations will be small due to type limitation. For example, the Amount field in the example relational data file 100 stores only small integers, so a value represented as a string of length k would have range size $10^k$ instead of $256^k$. The challenge in compression is to take advantage of this phenomenon without any a priori knowledge of field types.

Similar field values: Many values in a relational data file are distinct yet similar. For example, the Name field in the example file 100 shows "Leno, J." and "Leno, K." as two names with the same phone numbers. This could be different people in the same household or a typographical error. Knowing which is which might be an important data processing issue. But, from a data compression point of view, the main significance is that the similarity of the strings can be exploited to enhance compressibility.

Field correlations: Values in different fields may correlate with one another; e.g., the Name and Phone fields in the running example file 100. Such field correlations represent information redundancy that can be factored out in compression. As seen with the Leno records, this effect can be strong when approximately matched data are considered.

Next is developed the idea of a relational dependency transform to exploit the above features for compression. The discussion is related to that of the k-transform by Vo and Vo for table compression. However, the presently-described transform is designed to work on complex fields, not columns of single bytes. First, the field transform is defined:

Definition 1. Let R be a relational data file with m fields and n records. A dependency relation is a pair of fields (p, f). Let $\pi_p$ be the unique permutation that sorts the rows of field p lexicographically and stably. The field transform $\delta_p$ is defined by $\delta_p(f)[k]=f[\pi_p[k]]$ for $0 \leq k < n$.

In a dependency relation (p, f), p is called the predictor and f the predictee. The $\pi_p$ permutation is called a transform vector. It is clear that, as long asp is available, a transformed field $\delta_p(f)$ can be inverted via $f[\pi_p[k]]=\delta_p(f)[k]$ for $0 \leq k < n$.

It is noted that the use of a stable and lexicographic sort method is just one way to define $\pi_p$. Any method to produce a well-defined permutation by grouping data can be used, as applicable. In the general case, an application may use any standard or specially-devised semantics of a field to order its values. For example, if the values in a field are numerical values, the field-specific application-defined order may be a numerical order. In another example, if a field contains 32-bit IP addresses of the form 1.23.45.67, the application might treat each component of the four components as a numerical value, and then sort the entire set of IP addresses by their 4-value strings in a lexicographic order. Other application-defined orders of values may be used.

It is useful to consider dependency relations of the form ($\phi$, f), where $\phi$ is a virtual field and f a real field. The associated transform vector $\pi_\phi$ is defined to be the identity permutation so that $\delta_\phi(f)=f$.

A practical way is needed to measure the information content of a string. Following Buchsbaum et al., a compressor C is fixed and the compressive entropy of a byte string s is defined relative to C as $|C(s)|$, the length of the data after being compressed by C. The measure of information content across fields can now be defined as follows:

Definition 2. Let R be a relational data file and C some data compressor. If (p, f) is a dependency relation, the conditional compressive entropy of field f given field p is defined as $|C(\delta_p(f))|$.

Note that, for any field f, $|C(f)|=|=|C(\delta_\phi(f))|$, so compressive entropy is a special case of conditional compressive entropy. $|C(f)|<|f|$ means that the information content of field f is less than its raw data. Such an indication of information sparsity might be due to the field having few distinct values or because its values have similar characteristics.

More interestingly, $|C(\delta_p(f))|<|C(f)|$ means that field f can be compressed better after being transformed by $\delta_p$. From an information perspective, this means that the content of f is largely predictable by p. That is, the two fields are not independent from one another.

FIG. 2 shows the fields Name and Phone and their data 200 after being transformed by one another. The top portion 205 shows the record indexes and the fields in their original order. The first column of the bottom portion 206 shows the transform vector $\pi_{Name}$, the permutation of the indexes of the Name field after being lexicographically and stably sorted. $\pi_{Phone}$ is the same as $\pi_{Name}$ by construction. The second column in the bottom portion 206 shows the Phone field after being transformed by $\delta_{Name}$. Likewise, in the third column is the Name field after being transformed by $\delta_{Phone}$.

Suppose that compressor C codes runs of same values. Then, $|C(\delta_{Name}(\text{Phone}))|<|C(\text{Phone})|$ because the transformed field Phone could be coded with 4 runs while the original must be coded with 7 runs. $|C(\delta_{Phone}(\text{Name}))|<|C(\text{Name})|$ for similar reasons. As such, both Name and Phone are good transforms to enhance compression per compressor C. However, $\delta_{Name}$ would be better than $\delta_{Phone}$ because $|C(\delta_{Name}(\text{Phone}))|<|C(\delta_{Phone}(\text{Name}))|$.

A sequence of field transforms used in compression must be carefully chosen so that the transformed data can be decompressed. Thus, in the above example, only one of the transforms $\delta_{Name}$ or $\delta_{Phone}$ could be used. That is because when one of the fields is reconstructed during decompression, the other must be already in its original form for its corresponding transform vector to be computable. In general, cyclic sequences of relations must be avoided. This leads to the following definition:

Definition 3. Let R be a relational data file and D be a set of field dependency relations. Then, D is said to be a relational dependency transform if:

Every field f is a predictee in exactly one dependency relation (p, f)∈D, and

There is no sequence $(p_1, f_1), \ldots, (p_k, f_k)$ in D such that $p_1 = f_k$.

For any set S of dependency relations, a weighted directed graph $\mathcal{G}$(S) can be constructed by letting the node set be the set of predictors and predictees and the edge set comprises every pair (p, f)∈D with weight $C(\delta_p(f))$. In addition, let the compressive size of S be defined as $\Sigma_{(p, f) \in S} |C(\delta_p(f))|$.

As the focus is in compressing massive data, only linear-time algorithms are of interest for the choice of the compressor C used for computing compressive entropy. The below result therefore follows for the complexity of computing an optimum relational dependency transform:

Theorem 1. Let R be a relational data file with m fields and n records where m≤n and C a linear-time compressor. Then, an optimum relational dependency transform D, i.e., one with smallest compressive size, can be computed in time $O(m|R|)$.

Proof. Let E be the set of all dependency relations (p, f) where f is a real field of R while p≠f can be either a real field or $\phi$, the virtual field. If D is a relational dependency transform for R then D is a subset of E. Now, consider the graphs $\mathcal{G}$(E) and $\mathcal{G}$(D). By definition, every field f is in exactly one dependency relation (p, f)∈D. Since there is no cyclic sequence of relations, the graph $\mathcal{G}$(D) must form a branching in $\mathcal{G}$(E), as shown by J. Edmonds, Optimum Branchings, J. of Res. of The National Bureau of Standards, 71B:233-240 (1967), the contents of which is hereby incorporated by reference herein in its entirety.

Thus, computing an optimum relational dependency transform for the file R is equivalent to computing an optimum branching in $\mathcal{G}$(E). The optimum-branching algorithm set forth in T. Spencer H. N. Gabow, Z. Galil and R. E. Tarjan, Efficient Algorithms for Finding Minimum Spanning Trees in Undirected and Directed Graphs, In Proc. 25th Annual IEEE Symp. on Found. of Comp. Sci., pages 347-357 (1984), the contents of which is hereby incorporated by reference herein in its entirety, solves this problem in time $O((m+1)\log(i+1)+m(m+1)/2)$ because $\mathcal{G}$(E) has m+1 nodes and m(m+1) edges. With n>m, the time can be bounded by O(mn).

To quantify the total cost to compute an optimum dependency transform D, the cost to construct $\mathcal{G}$(E) must also be estimated. The cost of constructing an edge from p to f is $O(|f|+n)$ since the reordering of values of f by $\delta_p$ costs O(n) while compressing the result with C costs $O(|f|)$ by the assumption that C runs in linear time. As every field f has m possible predictors, the cost to construct all edges with f as a predictee is $O(m(|f|+n))$. Summing this quantity over all fields yields $O(m^2n+m\Sigma_f|f|)=O(m^2n+m|R|)$.

So, the total cost to compute an optimum dependency transform is $O(m^2n+m|R|+mn)$ with mn being the cost of computing the optimum branching. Since $mn \leq |R|$, the expression simplifies to $O(m|R|)$.

The condition $m \leq n$ in the theorem was just a formality. Any practical relational data file would have far more records than fields because fields represent abstract objects while records store actual instances of these objects and their relationships. In fact, in most cases, the number of fields would be small enough to be considered a constant. Then, the time to compute an optimum relational data transform can be seen as linear in the size of the data.

The following is a method RDT(R) to transform a relational data file R:

RDT(R)
1. Compute an optimum relational dependency transform D.
2. Sort the fields of R topologically based on $\mathcal{G}$ (D).
3. For each field f in this topological order, compute p(f) via the unique relation $(p, f) \in D$.

First, an optimum relational dependency transform D is computed at a cost $O(m|R|)$ time. Topologically sorting the fields takes time $O(m)$ where m is the number of fields. Finally, reordering the values in the fields cost $O(|R|)$. Thus, the total running time for the method is $O(m|R|)$. This theorem follows:

Theorem 2. Let R be a relational data file with m fields and n records where $m \leq n$ and C a linear-time compressor. Then, RDT transforms R in time $O(m|R|)$.

Inverting RDT is straightforward. Each field f is separately inverted in the same topological order shown in step 2 of the above method RDT. The topological order ensures that before the values of a field f are to be inverted the unique predictor p of f would be available in its original form. Thus, any needed transform vector will always be well-defined.

The major cost to invert RDT is in computing the transform vectors. As each is computed once per field f and costs $O(|f|)$ using bucket sort, the entire inversion process costs $O(|R|)$. Therefore:

Theorem 3. Let R be any relational data file. The transformed data RDT(R) can be inverted in time $O(|R|)$.

Compression Strategy

Below are a few engineering considerations in building and running a compressor:

Method RDT often yields the same optimum dependency transform when different compressors are used to compute compressive entropy. This is used to advantage by emulating a fast compressor that simply factors matched prefixes of successive field values to calculate compressive entropy without actually compressing.

Any compressor could be used to compress field data since they are just strings of bytes. The compressor may be an application-defined data compressor tailored to the types of data in the fields. The example of the present disclosure uses the Vo and Vo table compressor. Since it deals with fixed-length field data, fields with variable lengths are padded to a uniform length.

It is often not possible to process all of a large file in memory; nor is it necessary. In the present disclosure, the data is divided into windows; i.e., horizontal segments with suitable sizes, to be processed entirely in core each at a time. By default, the presently described compressor counts enough records to make up about 8 MBs and uses that as a window of data for compression.

Records in a relational data file tend to have similar characteristics. Thus, a sample of a few thousand records is more than adequate to compute an optimum dependency transform. Further, a computed transform can be reused in all windows of data.

The following is a compression scheme Compress(R) based on relational data transformation and the above engineering considerations:

Compress(R)
1. Use a training set of records to compute a relational dependency transform D.
2. Divide R into horizontal segments of appropriate sizes.
3. Transform field data in each segment via D.
4. Compress each transformed field based on some selected compressor C.

The time cost for the first three steps is bounded by $O(|R|)$ because only a small amount of data is used to compute D. Thus, the dominant time cost is incurred by the chosen compressor C. For example, if C is a linear time algorithm, then the entire compression process would run in linear time.

Performance

The experimental data presented here were obtained on a PC running Ubuntu Linux over a Pentium Conroe E2200 CPU with 2Gs of RAM.

The first two test compressors below were standard tools chosen to provide baseline data on how well compression could be done without any knowledge of structures in data. The last three helped to contrast compression results between using relational dependency transforms and not.

Gzip: the Unix compressor based on compression techniques described in J. Ziv and A. Lempel, A Universal Algorithm for Sequential Data Compression, IEEE Transactions on Information Theory, 23(3):337-343 (May 1977), and in D. A. Huffman, A Method for the Construction of Minimum-Redundancy Codes, Proceedings of the IRE, 40(9):1098-1101 (September 1952).

Bzip: a compressor described in J. Seward, Bzip2, http://www.bzip.org. Technical report (1994), and based on the Burrows-Wheeler Tranform (BWT) set forth in M. Burrows and D. J. Wheeler, A Block-Sorting Lossless Data Compression Algorithm, Report 124, Digital Systems Research Center (1994).

FIELD: a compressor based on padding field data to same lengths, then applying the table compressor described by Vo and Vo to each field.

TABLE: a compressor based on padding field data to same lengths, then treating the entire data as a large table and applying the Vo and Vo table compressor.

RDT: a compressor based on first transforming data with a relational dependency transform, padding fields as above, then applying the Vo and Vo table compressor to each transformed field.

The below test datasets were selected to represent broad categories of data including population statistics, finance, and computer and network engineering.

v9mpls: Samples of router to router connections in a large IP network.

stats: Performance statistics of components in a computing platform.

ca00003_uf1: A subset of the 2000 US Census data for California.

flow: Sample statistics of flows through various peer-to-peer networks.

ihrwpxco: Sample billing records of telephone calls fully rated for costs and taxes.

Figure 3:
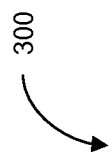
FIG. 3 is a table showing compression sizes and compression ratios for comparing various techniques including the techniques according to the present disclosure.

FIG. 3 presents a table 300 showing the raw and compressed sizes of data. The second row in each box for a compressor shows the respective compression ratio. Here are some observations:

RDT compressed best overall. Both TABLE and RDT did well as they were able to take advantage of dependency across fields to rearrange data. FIELD also did well even though it lost to Bzip on ca00003_uf1. This file had many fields of small integers and Bzip was able to pick up some dependency relations across fields due to its use of the Burrows-Wheeler Transform for context sorting. Gzip was far worse than the other compressors in all cases.

RDT improved substantially over FIELD as expected. The table compressor of Vo and Vo uses column dependency relations to rearrange data. Such relations, however, would be rare among columns of a single field, especially if such a field does not possess some complex substructure. The relational dependency transforms based on field dependency had larger contexts to work with and were much more effective than FIELD at rearranging data for compressibility.

The improvement of RDT over TABLE was noteworthy. In TABLE, the Vo and Vo table compressor was free to compute dependency relations in columns across all fields to rearrange data. However, column data were too narrow to fully capture all possible dependency relations. Again, the relational dependency transforms computed by RDT had larger contexts to work with and were more effective than TABLE at rearranging data for compressibility.

FIG. 4 is a table 400 showing both compression and decompression timing results. Here are some observations:

RDT was reasonably fast. Even a large file such as ihrwpxco with more than 2 GBs of data was compressed in just 151 seconds on a relatively slow processor. That was twice slower than Gzip but the additional time taken was worth it given the compression ratio improvement from under 12 to 1 to over 53 to 1.

Comparing RDT to FIELD and TABLE showed that the cost of transforming data with relational dependency transforms was acceptable, given the better compression ratios achievable. Even on ca00003_uf1 with a large number of small fields where both TABLE and RDT significantly slowed down, the time for RDT was still reasonable.

Gzip was fastest as expected. However, Bzip was quite slow because it used an algorithm for computing the Burrows-Wheeler Transform that ran in quadratic time on data with highly repetitive patterns. Such repetitions are common in relational data due to fewer data values and frequent field correlations.

The performance of FIELD, TABLE and RDT as compared to Gzip and Bzip confirmed that compressing relational data in a field-oriented way is effective. Further, RDT did that well with relatively small time costs.

Discussion

The relational dependency transform discussed here generalized the 1-transform used in the table compressor of Vo and Vo by lifting column dependency to field dependency. A key step was the introduction of conditional compressive entropy as a way to measure the information content in a field as well as across fields. The earlier comparison of the compressor RDT against FIELD and TABLE showed that the use of field dependency could yield substantial improvement in both compression rates and compression times over the use of just column dependency.

Raman and Swart discussed the use of field correlations to improve compression by co-coding such fields. However, in their framework, the correlations must be specified manually. The RDT method described herein discovers field correlations automatically. In addition, depending on the compressor used to compute compressive entropy, the computed field correlations could account for approximate matches in field values. That gives additional opportunities for enhancing compression.

Raman and Swart also discussed taking advantage of the lack of record order in a database table to sort records first to enhance compression. However, when records have many fields, it is difficult to tell what to sort by. And then, only some fields will be optimized while others not. The relational dependency transform discussed in the present disclosure addresses that problem by sorting field values in an invertible way based on dependency field transforms.

Certain information systems such as those based on the AT&T Daytona DBMS, or the system storing the file stats compressed at an 80 to 1 ratio with compressor RDT as described above, store database tables in files and build indexes of records for fast access. As such, any compressor used in these systems must preserve record order. These information systems also share a common data access pattern in which data are often written once but read many times. With disk transfer time orders of magnitude slower than CPU time, compression could be a critical component in improving throughput. That is because well compressed data could be retrieved from disk much faster than raw data and decompressed on line for processing. The mentioned information system with the file stats indeed uses RDT and gains both reduced data storage and fast data access.

Closely matched but different field data could sometimes indicate errors. For example, going back to the running example relational data file, the "Leno, J." and "Leno, K." values in its Name field could be such erroneous instances instead of true distinct values since their corresponding phone numbers were the same. That points to a way to identify potential data quality issues using correlated fields. First, conditional compressive entropy could be used to compute pairs of closely correlated fields. Then, for each such pair of fields, any values only approximately matched in one field but having exactly matched correspondences in the other field could be flagged as potential errors.

The computation of an optimum dependency transform may be related to the automatic discovery of field correlations. Limited experimentation has shown that the transforms computed by method RDT tended to be stable when different ways to compute compressive entropy were used. That hinted that such discovered dependency relations could be intrinsic to the data, hence, reflecting the true ones as defined by data semantics. Given its efficiency, some variation of method RDT may be used to discover relational structures in large files.

Implementation

Figure 5:
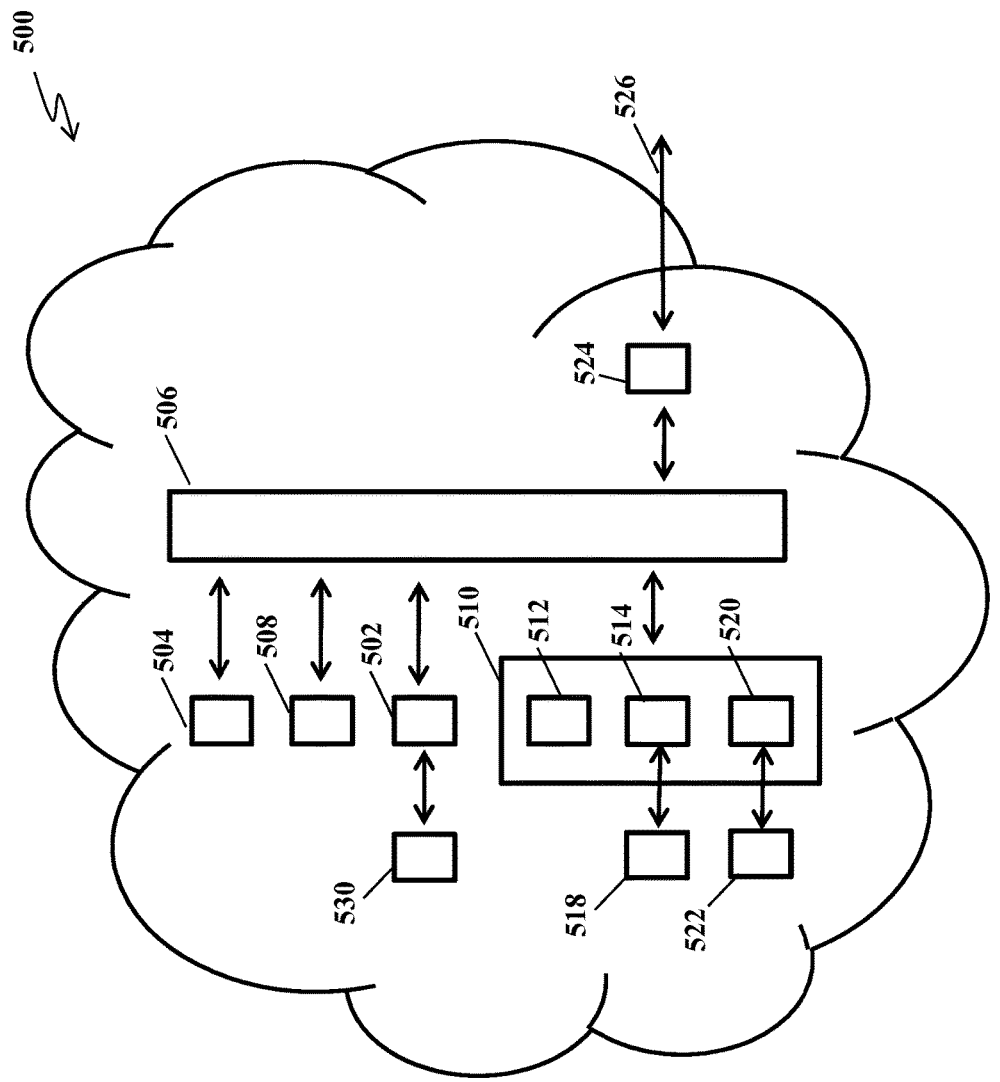
FIG. 5 is a schematic of an exemplary computer system that can be used to implement the techniques according to the present disclosure.

The present disclosure may be implemented using hardware, firmware, software or any combination thereof, and may be implemented in one or more computer systems and/or other processing systems. FIG. 5 is a schematic diagram of an exemplary computer system 500 that can be used as a network access device or a server to implement the functionality of the present disclosure. It will be appreciated by those skilled in the art that computer system 500 may operate as a server that is networked to other computers (network access devices) to operate as a client/server system, as known by those skilled in the art, or computer 500 may operate as a standalone system. Computer system 500 includes one or more processors, such as processor 504. While a single processor 504 is shown, the presently described linear programs may advantageously be solved using a multi-core machine. Processor 504 is connected to a communication infrastructure 506 (e.g., a communications bus, cross-over bar, or network). Computer system 500 can include a display interface 502 (e.g. a graphics card) that allows graphics, text, and other data from the communication infrastructure 506 (or from a frame buffer not shown) to be displayed on a display unit 530. Computer system 500 also includes a main memory 508, preferably random access memory (RAM), and may also include a secondary memory 510. The secondary memory 510 may include, for example, a hard disk drive 512 and/or a removable storage drive 514. The removable storage drive 514 has read/write functionality onto removable storage media 518 having stored therein computer software and/or data. In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500. Computer system 500 may also include a communications interface 524 allowing software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals (not shown), which may be electronic, electromagnetic, optical or other signals capable of being received by communications interface 524. These signals are provided to communications interface 524 via a communications path (e.g., channel) 526. This path 526 carries the signals and may be implemented using wire or cable, fiber optics, a telephone line, a cellular link, a radio frequency (RF) link and/or other communications channels. Computer programs (also referred to as computer control logic) are stored in main memory 508 and/or secondary memory 510. Computer programs may also be received via communications interface 524. Computer programs, when executed, enable the computer system 500 to perform the features of the present disclosure, as discussed herein. Accordingly, such computer programs represent controllers of the computer system 500. In an embodiment where the disclosure is implemented using software, the software may be stored in a computer program product and loaded into computer system 500 using removable storage drive 514, hard drive 512, or communications interface 524. The control logic (software), when executed by the processor 504, causes the processor 504 to perform the functions of the disclosure as described herein. In another embodiment, the disclosure is implemented primarily in hardware using, for example, hardware components, such as application specific integrated circuits (ASICs). Implementation of the hardware state machine so as to perform the functions described herein will be apparent to persons skilled in the relevant art(s). In one exemplary embodiment, the system for the present disclosure may be implemented as a desktop application program, which may reside on a computer hard drive, database or other repository of data, or be uploaded from the Internet or other network (e.g., from a PC, mini-computer, mainframe computer, micro-computer, telephone device, PDA, or other network access device having a processor and input and/or output capability). Any available software tool capable of implementing the concepts described herein may be used to implement the system and method of the present disclosure. The method and system of the present disclosure may also be implemented as an application-specific add-on to a program, or as a standalone application.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any machine encoded medium that provides or participates in providing instructions to one or more processors. Such a medium includes but is not limited to non-volatile media, volatile media and transmission media. For example, non-volatile media can include optical or magnetic memory disks. Volatile media include dynamic random access memory (DRAM), which typically constitutes the main memory. Common expedients of computer-readable media are well-known in the art and need not be described in detail here.

CONCLUSION

The present disclosure considers the problem of compressing relational data files. Conditional compressive entropy was introduced as a measure of information in single fields and between fields relative to some given compressor. This entropy notion was then used to define optimum relational dependency transforms suitable to condition relational data to make them more compressible. Efficient methods were presented to compute such transforms, apply them to compress data and invert them to decompress.

Engineering aspects in using relational dependency transforms for compression were discussed. Then, experimental results based on large datasets from actual systems were presented to show the effectiveness of the approach. The use of relational dependency transforms for compressing relational data file far outperformed standard tools such as Gzip and Bzip2 at a reasonable time cost.

Last but not least, real world data files are not always uniform. Relational data files often contain extra information such as headers and comments or sometimes even multiple record types. Such special structures are too adhoc to classify. However, it is often simple to recode such data into better forms for processing by suitable compression techniques. Thus, practical data compression requires not just good algorithms but also good software methods that accommodate such ad-hoc data transformations. For example, a software framework called Vcodex (K.-P. Vo. The Vcodex Platform for Data Compression. In Software and Data Technologies, $2^{nd}$ Int. Conf, ICSOFT/ENASE (2007)) may be used for writing data transforms and composing them for particular compression tasks. The field and column dependency transforms discussed in the present disclosure as well as a large number of other general compression algorithms may be included in such a framework.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

I claim:

1. A method for compressing a relational database using a particular compressor, the method comprising:
    selecting a training set of records from the relational database;
    computing, by a processor, using the training set of records, an optimum relational dependency transform comprising a set of field dependency relations each containing a predictor field of the relational database and a predictee field of the relational database, the computing comprising computing an optimum branching of a first graph having a node set that is a set of possible predictor fields and predictee fields of the relational database, and having an edge set that comprises possible dependency relations between the predictor fields and the predictee fields, each edge having a weight based on a compression by the same particular compressor of a transform of the predictee field based on a defined permutation of the predictor field;
    dividing the relational database into a plurality of horizontal segments;
    for each of the plurality of horizontal segments, producing a topologically sorted relational database segment by sorting, by a processor, the fields of the horizontal segment topologically based on a second graph having a node set that is a set of all of the predictor fields and the predictee fields of the optimum relational dependency transform, and having an edge set that comprises the set of field dependency relations of the optimum relational dependency transform;
    for each of the topologically sorted relational database segments and for each predictee field in the topologically sorted relational database segments, transforming, by a processor, the predictee field based on the defined permutation of the predictor field to produce a transformed horizontal segment; and
    compressing each transformed field using the predetermined compressor.

2. The method of claim 1, wherein the predefined compressor is a data compressor tailored for compressing data of types found in the fields of relational database.

3. The method of claim 1, wherein the defined permutation of the predictor field is based on a set of field-specific orderings of values.

4. The method of claim 3, wherein the values in the fields are ordered as strings of bytes and are sorted in a lexicographical order.

5. The method of claim 3, wherein the values in the fields are ordered as numerical values and are sorted in a numerical order.

6. The method of claim 1, wherein there are no cyclic sequences in the optimum relational dependency transform.

7. The method of claim 1, wherein an application defines its own ordering for the values in the fields.

8. A non-transitory computer-usable medium having stored thereon computer readable instructions for compressing a relational database using a particular compressor, wherein execution of the computer readable instructions by a processor causes the processor to perform operations comprising:
    selecting a training set of records from the relational database;
    computing, using the training set of records, an optimum relational dependency transform comprising a set of field dependency relations each containing a predictor field of the relational database and a predictee field of the relational database, the computing comprising computing an optimum branching of a first graph having a node set that is a set of possible predictor fields and predictee fields of the relational database, and having an edge set that comprises possible dependency relations between the predictor fields and the predictee fields, each edge having a weight based on a compression by the same particular compressor of a transform of the predictee field based on a defined permutation of the predictor field;
    dividing the relational database into a plurality of horizontal segments;
    for each of the plurality of horizontal segments, producing a topologically sorted relational database segment by sorting the fields of the horizontal segment topologically based on a second graph having a node set that is a set of all of the predictor fields and the predictee fields of the optimum relational dependency transform, and having an edge set that comprises the set of field dependency relations of the optimum relational dependency transform;
    for each of the topologically sorted relational database segments and for each predictee field in the topologically sorted relational database segments, transforming the predictee field based on the defined permutation of the predictor field to produce a transformed horizontal segment; and compressing each transformed field using the predetermined compressor.

9. The non-transitory computer-usable medium of claim 8, wherein the predefined compressor is a data compressor tailored for compressing data of types found in the fields of relational database.

10. The non-transitory computer-usable medium of claim 8, wherein the defined permutation of the predictor field is based on a set of field-specific orderings of values.

11. The non-transitory computer-usable medium of claim 10, wherein the values in the fields are ordered as strings of bytes and are sorted in a lexicographical order.

12. The non-transitory computer-usable medium of claim 10, wherein the values in the fields are ordered as numerical values and are sorted in a numerical order.

13. The non-transitory computer-usable medium of claim 8, wherein there are no cyclic sequences in the optimum relational dependency transform.

* * * * *